United States Patent
Jo et al.

(10) Patent No.: US 7,176,274 B1
(45) Date of Patent: Feb. 13, 2007

(54) SATURATED POLYESTER FOR PLASTIC CONTAINERS WITH EXCELLENT HEAT RESISTANCE AND GAS IMPERMEABILITY AND METHOD FOR MANUFACTURING THE SAME

(75) Inventors: Deog Jae Jo, Kyungsangbuk-do (KR); Soon Sik Kim, Seoul (KR); Jin Woo Lee, Kumi-si (KR)

(73) Assignee: Saehan Industries Incorporated, Kyongsangbuk-Do (KR)

( * ) Notice: Subject to any disclaimer, the term of this patent is extended or adjusted under 35 U.S.C. 154(b) by 368 days.

(21) Appl. No.: 10/286,377

(22) Filed: Nov. 4, 2002

(51) Int. Cl.
*C08G 63/127* (2006.01)
*C08K 3/36* (2006.01)

(52) U.S. Cl. .............. 528/308.3; 524/493; 977/DIG. 1

(58) Field of Classification Search .............. 524/492, 524/493; 528/308.3
See application file for complete search history.

(56) References Cited

U.S. PATENT DOCUMENTS

| | | | | |
|---|---|---|---|---|
| 5,336,709 A | * | 8/1994 | Antikow et al. | 524/493 |
| 5,382,651 A | * | 1/1995 | Kim et al. | 528/283 |
| 6,323,271 B1 | * | 11/2001 | Caldwell et al. | 524/492 |
| 6,472,046 B1 | * | 10/2002 | Kubo et al. | 428/141 |
| 6,632,487 B1 | * | 10/2003 | Arai et al. | 428/32.21 |
| 6,670,030 B1 | * | 12/2003 | Uchida et al. | 428/323 |
| 2003/0165700 A1 | * | 9/2003 | Kosuge et al. | 428/483 |

FOREIGN PATENT DOCUMENTS

| | | | | |
|---|---|---|---|---|
| JP | 03199239 A | * | 8/1991 | |
| JP | 2824448 B2 | * | 11/1998 | |

* cited by examiner

*Primary Examiner*—Tae H Yoon
(74) *Attorney, Agent, or Firm*—Egbert Law Offices

(57) ABSTRACT

A method of manufacturing a plastic container includes adding nano-sized silica particles to a saturated polyester in an amount of 20 ppm to 10% by weight during transesterification or esterification and polycondensing an aromatic dicarboxylic acid and ethylene glycol as starting materials. The silica particles have an average particle diameter of 3–100 nm. The saturated polyester is polyethyleneterephthalate.

1 Claim, No Drawings

SATURATED POLYESTER FOR PLASTIC CONTAINERS WITH EXCELLENT HEAT RESISTANCE AND GAS IMPERMEABILITY AND METHOD FOR MANUFACTURING THE SAME

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to a saturated polyester which is widely used as a material for various molded containers such as plastic bottles, plastic cups, etc., and more particularly to a saturated polyester having excellent heat resistance and high gas impermeability by the presence of nano-sized silica particles in a polymer chain and a method for manufacturing the saturated polyester.

BACKGROUND OF THE INVENTION

Saturated polyester, such as polyethylene terephthalate (PET) or polybutylene terephthalate (PBT), is a linear thermoplastic polymer comprising ester bonds in a main chain. Since the saturated polyester is advantageous in dimension stability, weather resistance and surface smoothness and has high transparency and glossy appearance, it has been widely used as a material for various molded articles such as synthetic fibers, films, containers, housings, etc.

However, the saturated polyester has disadvantages that since it exhibits low glass transition temperature (Tg), poor heat resistance, and gas permeability to some gases, it cannot be used as a packaging material for fruit beverages, beers, green tea products, rice beverages, etc.

In order to solve these disadvantages, polyethylenenaphthalate (PEN) resin and a mixed polymer of polyethylene-terephthalate and polyethylenenaphthalate have been proposed. These products are currently in use. However, the price of polyethylenenaphthalate (PEN) resin is high relative to polyethyleneterephthalate and thus is economically disadvantageous. Moreover, it is difficult to recycle the polyethylenenaphthalate resin. Alternatively, a method for improving heat resistance, transparency and gas impermeability is disclosed in Japan Patent Laid-open No. 1997-290457. In accordance with this method, the crystal orientation of polyester is enhanced by performing biaxial stretching during molding of PET bottle. However, some problems of this method are that the degree of crystal orientation cannot be raised to above 40%, and it is not usable in the case of charging beverage into PET bottle at high temperature above 92° C. Furthermore, in the case of charging at low temperature, the productivity drops.

BRIEF SUMMARY OF THE INVENTION

Therefore, the present invention has been made in view of the above problems, and it is an object of the present invention to provide a saturated polyester for plastic containers having excellent heat resistance and high gas impermeability by uniformly dispersing nano-sized silica particles in polyester to raise the degree of crystal orientation to above 40%.

It is another object of the present invention to provide a method for manufacturing the saturated polyester for plastic containers having excellent heat resistance and high gas impermeability.

In accordance with the present invention, there is provided a saturated polyester comprising nano-sized silica particles, the nano-sized silica particles having an average particle diameter of 3~100 nm and being present in an amount of 20 ppm~10% by weight, based on the weight of the saturated polyester.

The saturated polyester according to the present invention is manufactured by adding the nano-sized silica particles during transesterification or esterification followed by polycondensing starting materials.

Hereinafter, the present invention will be explained in more detail.

Generally, saturated polyester is produced from an aromatic dicarboxylic acid or an ester-forming derivative and ethylene glycol as starting materials. If necessary, other starting materials may be added. Examples of the aromatic dicarboxylic acid used in the present invention include isophthalic acid, terephthalic acid, 2,6-naphthalenedicarboxylic acid, phthalic acid, adipic acid, sebacic acid and mixtures thereof. As examples of the glycol used in the present invention, a small amount of propylene glycol, butanediol, 1,4-cyclohexanedimethanol, neopentyl glycol, etc., can be added to ethylene glycol.

If necessary, the saturated polyester can further comprise additives such as heat stabilizers, anti-blocking agents, anti-oxidants, antistatic agents, UV absorbers, etc.

In accordance with the present invention, the nano-sized silica particles are added during manufacture of saturated polyester. At this time, the nano-sized silica particles must be maintained at a constant size during the reaction.

The nano-sized silica particles used in the present invention are obtained as follows: first, sodium silicate ($Na_4Si$) is reacted with water to produce soda silicate. Subsequently, the soda silicate is passed through a cation exchange resin column. Sodium oxide adsorbed to the cation exchange resin is removed to obtain fine silica particles. The fine silica particles thus obtained have an average particle diameter of 0.5 mm~1.0 nm. Finally, to obtain nano-sized silica particles having a desired size, the fine silica particles are crystal-grown.

The nano-sized silica particles thus obtained show good dispersibility in water. However, since the nano-sized silica particles rapidly agglomerate upon loss of water due to low boiling point of water, they are stored in a liquid having high boiling point such as ethylene glycol or butanediol. In particular, to minimize side reactions with the saturated polyester, the silica particles are preferably dispersed in ethylene glycol (EG). The nano-sized silica particles having the same average particle diameter can be used alone, or two or more types of the nano-sized silica particles having different average particle diameter can be mixed with each other. To form a slurry containing the nano-sized silica particles, solvent can be used alone, or two or more solvents can be mixed with each other.

The amount of the nano-sized silica particles added is preferably in the range of 20 ppm~10% by weight, and more preferably in the range of 50 ppm~6% by weight, based on the weight of the saturated polyester. When the amount of the nano-sized silica particles is less than 20 ppm, physical properties of the saturated polyester according to the present invention are unsatisfactory. When the amount of the nano-sized silica particles exceeds 10% by weight, good dispersibility of the nano-sized silica particles in polymer is not obtained and the transparency of the saturated polyester becomes low due to the particle agglomeration. In accordance with the present invention, the silica particles have an average particle diameter of 3~100 nm. When the average particle diameter of the silica particles is larger than 100 nm, transparency becomes poor. When the average particle diameter of the silica particles is smaller than 3 nm, dispersibility and transparency are poor due to surface tension between particles.

To enhance the color tone of resin, phosphorous compounds, e.g., trimethylphosphate (TMP), triethylphosphate (TEP), triphenylphosphate (TPP), may be added together with the nano-sized silica particles. Considering equivalence ratio with metal ions, the amount of phosphorous compounds added is adjusted so as to render phosphorous content in polymer to be 0.01~0.1% by weight, based on the weight of polymer.

As described above, in order to better disperse the nano-sized silica particles, it is preferred that the particles are previously dispersed in water, ethylene glycol, butanediol or mixtures thereof to form a slurry. The concentration of the nano-sized silica particles in the slurry is preferably in the range of 3~30% by weight, and more preferably in the range of 5~20% by weight, based on the weight of the slurry. When the concentration of the nano-sized silica particles in the slurry is lower than 3% by weight, too much slurry is added, thus causing side reactions. When the concentration of the nano-sized silica particles in the slurry is higher than 30% by weight, the dispersibility of the particles becomes poor and a large amount of crude particles are formed. To enhance the dispersibility of the particles, the smaller particles make the concentration of the slurry lower. When the size of the particles is larger, the concentration of the particles in the slurry may be increased.

When adding the slurry containing the nano-sized silica particles slurry during synthesis of polyester, it is noted that the nano-sized silica particles must not be agglomerated with each other. In accordance with the present invention, the molar ratio (E/T) of ethylene glycol (EG) to dimethyl terephthalate (DMT) is preferably in the range of 1.8~2.5 and the molar ratio (E/T) of ethylene glycol (EG) to terephthalic acid (TPA) is preferably in the range of 1.3~2.5. Processes for better dispersing the nano-sized silica particles in the polyester are not especially restricted, but since a slurry of the particles in water can cause side reactions in the DMT process, the particles are preferably dispersed in ethylene glycol (EG) or butanediol (BD). In the TPA (Terephthalic Acid) process, though the slurry contains water, there is no problem in conducting the reaction. However, the DMT process is advantageous over the TPA process in terms of dispersibility of the particles.

DETAILED DESCRIPTION OF THE INVENTION

The present invention is illustrated in greater detail below with reference to Examples and Comparative Examples. These Examples are provided only for illustrative purposes, but are not to be construed as limiting the scope of the present invention.

EXAMPLE 1

100 parts by weight of dimethyl terephthalate (DMT) and 64 parts by weight of ethylene glycol (EG) were charged into a reactor and a dispersion of 0.03 parts by weight of antimony trioxide and 0.06 parts by weight of manganese acetate tetrahydrate in 3 parts by weight of ethylene glycol was added thereto while stirring. The mixture was heated to a temperature of 130~230° C. and subjected to transesterification for 4 hours to form BHT (B-1). A slurry of 10% by weight of silica particles having an average particle diameter of 50 nm in ethylene glycol was passed through a filter with a mesh size of 0.5 µm to obtain a slurry (S-1). When the temperature of the (B-1) was raised to about 235° C., a dilution of 0.03 parts by weight of trimethylphosphate (TMP) in 2 parts by weight of ethylene glycol was charged into the reactor and then 20 parts by weight of the slurry (S-1) was slowly added thereto. The BHT was passed through a filter with a mesh size of 3 µm. After the filtrate was heated to a temperature of 235~285° C. over 50 minutes, polycondensation was carried out for 3 hours to manufacture a polymer (P-1-1) having physical properties listed in Table 1 below. The polymer was cut into chips. The cut chips were added to a general solid-state polymerization reactor and subjected to solid-state polymerization to manufacture a polymer (P-1-2) having listed in Table 1 below. Using a heat resistant PET bottle blow machine, 500 cc heat resistant bottles (P-1-3) were manufactured from the (P-1-2).

EXAMPLE 2

Polymers and heat resistant PET bottles were manufactured in the same manner as in Example 1, except that 1 parts by weight of the nano-sized particle slurry (S-1) were added to the BHT at a temperature of 235° C. and subjected to polycondensation.

EXAMPLE 3

Polymers and heat resistant PET bottles were manufactured in the same manner as in Example 1, except that silica particles having an average particle diameter of 15 nm were used to form the slurry (S-1) instead of the silica particles having an average particle diameter of 50 nm.

EXAMPLE 4

Polymers and heat resistant PET bottles were manufactured in the same manner as in Example 1, except that 1 parts by weight of the nano-sized particle slurry (S-1) formed in Example 3 were added to the BHT at a temperature of 235° C. and subjected to polycondensation.

EXAMPLE 5

100 parts by weight of terephthalic acid and 75 parts by weight of ethylene glycol were charged into a reactor. The mixture was heated from a temperature of 30° C. to 230° C. while stirring, and subjected to esterification for 6 hours to obtain BHT. After 175 parts by weight of a slurry of EG and TPA (molar ratio: 2.0) were added to the BHT over 2 hours, the reaction was further carried out for 1.5 hours while maintaining the reaction temperature at 230° C. 175 parts by weight of the BHT were passed through a filter with a mesh size of 3.0 µm, and the filtrate was transferred to a polycondensation reactor. 0.02% by weight of phosphoric acid, based on the weight of the polymer, was added to the polycondensation reactor, and then a dilution of 0.015% by weight of antimony trioxide based on the weight of the polymer in a small amount of ethylene glycol was added thereto. Silica particles having an average particle diameter of 15 nm were dispersed in 10% by weight of ethylene glycol to form a slurry. The slurry was passed through a filter with a mesh size of 0.5 µm to form a slurry (S-2). 20 parts by weight of the slurry were added to the BHT at a temperature of 230° C. After the BHT was heated to a temperature of 230~285° C. over 50 minutes, polycondensation was carried out for 3 hours to manufacture a polymer having physical properties listed in Table 1 below. The polymer was cut into chips (P-5-1). The cut chips were added to a general solid-state polymerization reactor and subjected to solid-state polymerization to manufacture a polymer (P-5-2) having physical properties listed in Table 1 below. Using a heat resistant PET bottle blow machine, 500 cc heat resistant bottles (P-5-3) were manufactured from the (P-5-2).

EXAMPLE 6

Polymers and heat resistant PET bottles were manufactured in the same manner as in Example 5, except that 1 parts by weight of the nano-size particle slurry (S-2) were added to the BHT at temperature of 235° C. and subjected to polycondensation.

EXAMPLE 7

Polymers and heat resistant PET bottles were manufactured in the same manner as in Example 5, except that silica particles having an average particle diameter of 3 nm were used to form the slurry (S-2) instead of the silica particles having an average particle diameter of 15 nm.

EXAMPLE 8

Polymers and heat resistant PET bottles were manufactured in the same manner as in Example 7, except that 0.05 parts by weight of the nano-sized particle slurry (S-2) formed in Example 7 were added to the BHT at a temperature of 235° C. and subjected to polycondensation.

EXAMPLE 9

Polymers and heat resistant PET bottles were manufactured in the same manner as in Example 5, except that 50 parts by weight of the slurry (S-2) containing silica particles having an average particle diameter of 100 nm, instead of the silica particles having an average particle diameter of 15 nm, were added to the BHT at a temperature of 230° C. and subjected to polycondensation.

EXAMPLE 10

Polymers and heat resistant PET bottles were manufactured in the same manner as in Example 5, except that 0.05 parts by weight of the slurry (S-2) containing silica particles having an average particle diameter of 100 nm, instead of the silica particles having an average particle diameter of 15 nm, were added to the BHT at a temperature of 230° C. and subjected to polycondensation.

COMPARATIVE EXAMPLE 1

100 parts by weight of terephthalic acid and 75 parts by weight of ethylene glycol were added to a reactor. The mixture was heated to a temperature of 230° C. while stirring, and subjected to esterification for 6 hours to obtain BHT. After 175 parts by weight of a slurry of EG and TPA (molar ratio: 2.0) were added to the BHT over 2 hours, the reaction was further carried out for 1.5 hours while maintaining the reaction temperature at 230° C. 175 parts by weight of the BHT were passed through a filter with a mesh size of 3.0 μm, and the filtrate was transferred to a polycondensation reactor. 0.02% by weight of phosphoric acid, based on the weight of the polymer, was added to the polycondensation reactor, and then a dilution of 0.015% by weight of antimony trioxide based on the weight of the polymer in a small amount of ethylene glycol was added thereto. After the BHT was heated to a temperature of 230~285° C. over 50 minutes, polycondensation was carried out for 3 hours to manufacture a polymer (P-11-1) having physical properties listed in Table 1 below. The polymer was cut into chips. The cut chips were added to a general solid-state polymerization reactor and subjected to solid-state polymerization to manufacture a polymer (P-11-2) having listed in Table 1 below. Using a heat resistant PET bottle blow machine, 500 cc heat resistant bottles (P-11-3) were manufactured from the (P-11-2).

COMPARATIVE EXAMPLE 2

Polymers and heat resistant PET bottles were manufactured in the same manner as in Example 5, except that silica particles having an average particle diameter of 20 nm were used to form the slurry (S-2) instead of the silica particles having an average particle diameter of 15 nm.

COMPARATIVE EXAMPLE 3

Polymers and heat resistant PET bottles were manufactured in the same manner as in Comparative Example 2, except that 1 parts by weight of the slurry (S-2) containing silica particles having an average particle diameter of 200 nm, instead of the silica particles having an average particle diameter of 200 nm, were added to the BHT at a temperature of 230° C. and subjected to polycondensation.

COMPARATIVE EXAMPLE 4

Polymers and heat resistant PET bottles were manufactured in the same manner as in Example 5, except that silica particles having an average particle diameter of 100 nm, based on the weight of the polymer, were used in concentration of 100 ppm to form the slurry (S-2). In this Example, since the silica particles in the polymer were agglomerated with each other in the form of impurities having a size of about 3 mm, solid-state polymerization was not carried out.

Physical properties of the polymers and heat resistant PET bottles manufactured in Examples and Comparative Examples are listed in Table 1.

TABLE 1

| Saturated polyester | Physical property | Unit | Ex. 1 | Ex. 2 | Ex. 3 | Ex. 4 | Ex. 5 | Ex. 6 | Ex. 7 | Test Method |
|---|---|---|---|---|---|---|---|---|---|---|
| Liquid-State polymerization | IV | N | 0.627 | 0.633 | 0.630 | 0.630 | 0.627 | 0.630 | 0.620 | ASTM-D-4603 |
| | Color L | — | 64.1 | 59.1 | 62.1 | 57.4 | 59.3 | 54.6 | 56.1 | JIS-Z-8730 |
| | Color b | — | −1.4 | −2.2 | −2.4 | −2.4 | −3.9 | −4.4 | −2.4 | JIS-Z-8730 |
| | DSC (Tm) | ° C. | 254.3 | 252.4 | 252.4 | 251.8 | 247.6 | 248.9 | 250.2 | ASTM-D-3418 |
| | —COOH | eq/ton | 13 | 17 | 14 | 19 | 17 | 22 | 23 | N/25NaOH titration |

TABLE 1-continued

| Saturated polyester | Physical property | Unit | | | | | | | | Test Method |
|---|---|---|---|---|---|---|---|---|---|---|
| | HAZE | % | 6.4 | 1.9 | 3.9 | 1.2 | 4.2 | 1.5 | 2.9 | ASTM-D-1003 |
| | $SiO_2$ particle diameter | nm | 50 | 50 | 15 | 15 | 15 | 15 | 3 | |
| | $SiO_2$ Content | wt % | 2.0 | 0.1 | 2.0 | 0.1 | 2.0 | 0.1 | 10.0 | EPA 200.7 |
| Solid-State polymerization | IV | n | 0.78 | 0.77 | 0.79 | 0.78 | 0.78 | 0.78 | 0.80 | ASTM-D-4603 |
| | Color L | — | 86.9 | 87.1 | 87.9 | 87.3 | 87.7 | 87.4 | 86.5 | JIS-Z-8730 |
| | Color b | — | -0.6 | -1.1 | -1.6 | -1.5 | -3.0 | -3.4 | -1.5 | JIS-Z-8730 |
| | Degree of Crystallization | % | 54.1 | 53.6 | 54.5 | 53.9 | 54.7 | 54.1 | 53.8 | ASTM-D-1505 |
| Heat resistant bottle | Heat resistance | °C | 98 | 91 | 100 | 98 | 100 | 98 | 100 | |
| | $O_2$ impermeability | cc/pack/day | 0.038 | 0.045 | 0.016 | 0.038 | 0.018 | 0.037 | 0.010 | |
| | HAZE | — | 15.1 | 8.4 | 10.2 | 7.4 | 10.6 | 7.9 | 8.5 | |
| | Lowest degree of crystallization | % | 41 | 38 | 44 | 42 | 44 | 42 | 45 | ASTM-D-1505 |

| Saturated polyester | Physical property | Unit | Ex. 8 | Ex. 9 | Ex. 10 | Com. Ex. 1 | Com. Ex. 2 | Com. Ex. 3 | Com. Ex. 4 | Test Method |
|---|---|---|---|---|---|---|---|---|---|---|
| Liquid-state polymerization | IV | n | 0.637 | 0.633 | 0.630 | 0.630 | 0.627 | 0.630 | 0.630 | ASTM-D-4603 |
| | Color L | — | 54.1 | 69.1 | 69.1 | 57.1 | 75.4 | 60.6 | 57.7 | JIS-Z-8730 |
| | Color b | — | -2.4 | -2.2 | -2.4 | -2.4 | -3.9 | -4.4 | -2.6 | JIS-Z-8730 |
| | DSC (Tm) | °C | 250.3 | 250.4 | 250.6 | 250.2 | 247.6 | 248.9 | 250.2 | ASTM-D-3418 |
| | —COOH | eq/ton | 23 | 27 | 23 | 29 | 17 | 22 | 30 | N/25NaOH titration |
| | HAZE | % | 0.8 | 10.9 | 1.6 | 0.7 | 81.0 | 15.0 | 55.0 | ASTM-D-1003 |
| | $SiO_2$ particle diameter | nm | 3 | 100 | 100 | — | 200 | 200 | 2 | |
| | $SiO_2$ content | wt % | 0.005 | 5.0 | 0.005 | 0.0 | 5.0 | 0.01 | 0.01 | EPA 200.7 |
| Solid-state polymerization | IV | N | 0.80 | 0.77 | 0.79 | 0.80 | 0.78 | 0.78 | — | ASTM-D-4603 |
| | Color L | — | 86.9 | 87.6 | 87.3 | 86.5 | 89.7 | 87.7 | — | JIS-Z-8730 |
| | Color b | — | -1.6 | -1.1 | -1.6 | -1.5 | -3.0 | -3.4 | — | JIS-Z-8730 |
| | Degree of crystallization | % | 54.1 | 53.6 | 54.5 | 53.8 | 54.7 | 54.1 | — | ASTM-D-1505 |
| | AA | ppm | 0.7 | 0.8 | 0.8 | 0.8 | 0.8 | 0.8 | — | ASTM-D-4509 |
| Heat resistant bottle | Heat resistance | °C | 93 | 100 | 91 | 90 | 91 | 91 | — | |
| | $O_2$ impermeability | cc/pack/day | 0.040 | 0.038 | 0.045 | 0.046 | 0.045 | 0.046 | — | |
| | HAZE | — | 6.8 | 31.4 | 20.2 | 6.4 | 89.6 | 65.2 | — | |
| | Lowest degree of crystallization | % | 38 | 42 | 37 | 35 | 42 | 37 | — | ASTM-D-1505 |

Heat resistance and gas impermeability to $O_2$ were measured in the following manner:

-Heat resistance-

Heat resistance of bottles is expressed as heat resistant temperature. First, water was heated to a predetermined temperature, which is an initial heat resistant temperature, and was momentarily charged into a bottle. The morphology stability of the bottle was evaluated.

-Gas impermeability to $O_2$-

A bottle was protected against oxygen using epoxy. Nitrogen gas was charged into the bottle at a certain rate, and then discharged out of the bottle. The concentration of oxygen contained in the nitrogen gas was measured. Based on the concentration, the amount of oxygen permeating through the bottle from the outside in one day was calculated.

As described above, according to the present invention, the saturated polyester having excellent heat resistance and high impermeability to gases, e.g., $O_2$ is provided. Therefore, the saturated polyester product according to the present invention is useful as a material for various bottles containing beverages or foods.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

We claim:

1. A method of manufacturing a saturated polyester for use in forming plastic containers, the method consisting of the steps of;

forming nano-sized silica particles by reacting sodium silicate with water so as to produce soda silicate;

passing the soda silicate through a cation exchange resin column;

removing sodium oxide adsorbed to said cation exchange resin column so as to form fine silica particles;

crystal-growing said fine silica particles to said nano-sized silica particles;

adding said nano-sized silica particles to the saturated polyester that is formable into a plastic container in an amount of 20 ppm to 10% by weight based on a weight of the saturated polyester during transesterification or esterification thereof, said nano-sized silica particles having an average particle diameter of between 3 and 100 nanometers; and polycondensing an aromatic dicarboxylic acid and ethylene glycol as starting materials.

* * * * *